Dec. 23, 1924.
C. H. BEDELL
COMPASS SYSTEM
Filed April 27, 1922
1,520,002
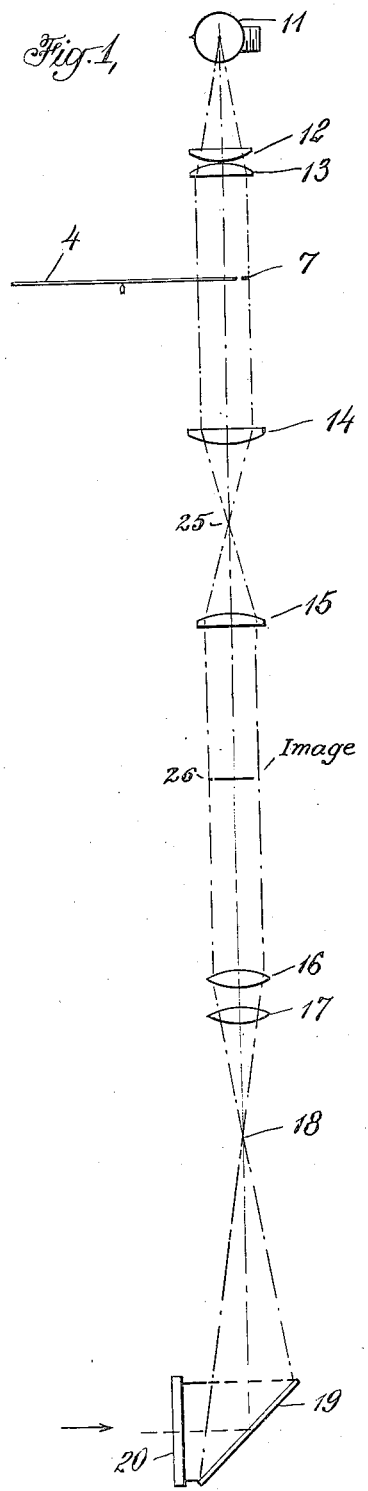
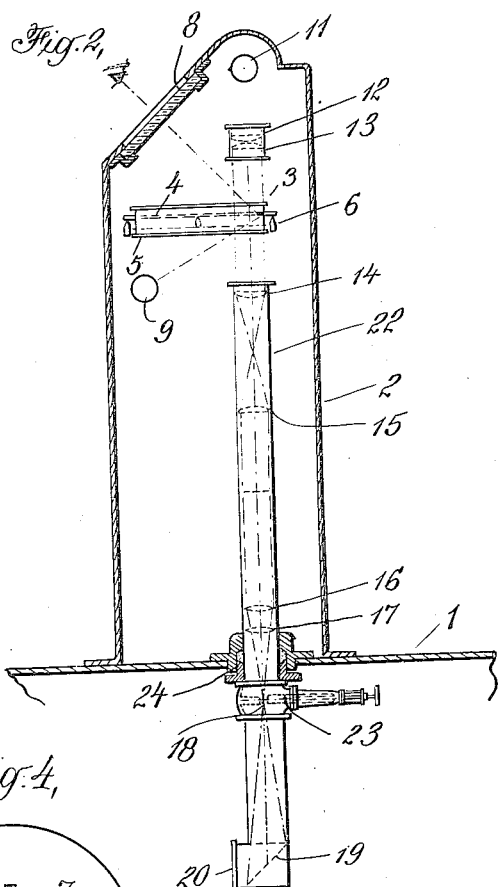
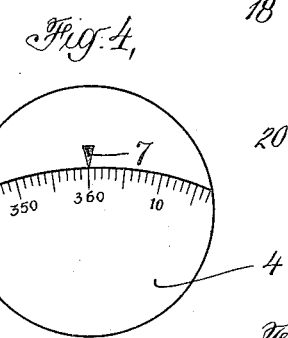
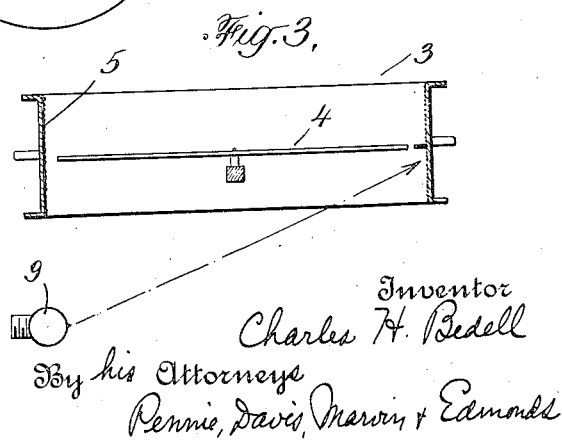
Inventor
Charles H. Bedell
By his Attorneys
Pennie, Davis, Marvin & Edmonds Patented Dec. 23, 1924.

1,520,002

UNITED STATES PATENT OFFICE.

CHARLES H. BEDELL, OF NEW LONDON, CONNECTICUT, ASSIGNOR TO ELECTRIC BOAT COMPANY, A CORPORATION OF NEW JERSEY.

COMPASS SYSTEM.

Application filed April 27, 1922. Serial No. 557,029.

*To all whom it may concern:*

Be it known that I, CHARLES H. BEDELL, a citizen of the United States, residing at New London, in the county of New London, State of Connecticut, have invented certain new and useful Improvements in Compass Systems; and I do hereby declare the following to be a full, clear, and exact description of the invention, such as will enable others skilled in the art to which it appertains to make and use the same.

This invention relates to a compass system for ships, by means of which accurate readings may be had of the card from a point so distant that direct observations may be unsatisfactory.

As is usual in ship construction, iron and steel are extensively used, and the magnetic compass is placed as far as possible from such material. On surface ships the standard compass is usually placed at some distance above the pilot house, and a secondary compass within that house is used in the actual working of the ship; allowance being made for the difference in the readings of the two compasses. On submarines, the compass is usually mounted in a watertight binnacle of non-magnetic material, above the superstructure, with a heavy plate glass window, so located that the opaque white card may be read from the station on the bridge, and a second opaque white card placed immediately below the other for observation from below. Observation from below has been either by direct vision assisted by a lens placed below the compass, or by means of a telescope. The direct vision method has proved unsatisfactory, as the distance prevents accurate reading of the card. The telescope method has also proved unsatisfactory, for while accurate readings are obtained the holding of the eye to the eye piece for long periods of time is very fatiguing and interferes with general observation in the control of the station.

It is therefore an object of the present invention to devise means for projecting an image of the compass card to a relatively distant point, in such a manner that the image can be read with both eyes and with the same ease and accuracy as the actual card itself, without at the same time interfering in any way with direct reading.

This object is attained by the use of an optical system which projects an image of the compass card on a distantly placed screen, ordinarily below the compass, in much the same manner that a stereopticon slide is projected. As the compass card serves as the slide it must be transparent with opaque graduations, and the compass box must permit the passage of light through it. The lubber line is in the form of an opaque pointer projecting from the side of the box. In order that the use of the transparent card should not interfere with direct reading from above, the inner face of the compass box is whitened and a light placed within the binnacle to illuminate this white surface and cause the opaque graduations of the card to stand out in sharp relief so that they are clearly visible to one reading the card from above.

The lenses of the system are mounted within a tube which extends from a point adjacent the compass to the screen. In the case of a submarine, this tube must, of course, pass through the hull, and in this case, should the binnacle spring a leak the danger would arise of flooding the vessel through the lens tube upon submergence. To guard against this is a further object of the invention. It is attained by placing a gate valve in the tube so that all communication with the binnacle will be quickly and effectively cut off in an emergency, and so placing this valve relative to the beam of light passing through it, that a valve opening of minimum size can be used without interfering with the operation of the projecting system.

When a submarine is submerged it is obvious that readings of the compass in the binnacle must be from below, and for this reason the need of an improved system for distant reading is more imperative in the case of a submarine than in the case of a surface vessel. The invention has, therefore, been described with particular reference to submarine use, although it is clear that it is not necessarily so limited.

The invention will be more clearly understood by referring to the accompanying drawings in which—

Figure 1 is a diagram of the optical system employed for indirect readings; Figure 2 is a vertical section, more or less diagrammatic, through the binnacle and part of the hull showing a compass mounted for both direct and indirect reading; Figure 3 is a section on an enlarged scale through the compass box, and Figure 4 represents the view of a portion of the compass card as seen on a ground glass screen within the vessel.

In these drawings, 1 represents the hull of the vessel and 2 a watertight binnacle mounted on its upper surface. Within the upper part of this binnacle is mounted the compass 3 comprising a compass card 4 within a compass box, or bowl 5, which box is mounted for universal movement on a gimbal 6. The compass card 4 is made transparent, at least on its periphery and bears an opaque scale. The compass box 5 has a transparent bottom which permits of illumination of its interior by means of a light situated beneath it and also permits reading of the transparent compass card from a point beneath it. A sharp black point 7 is fixed on the inner wall of the compass box 5 and serves as a lubber line, the inner walls of this box being made white for the purpose of increasing the visibility of this black point and the compass scale. The knife edge of the gimbal, the compass card and the lubber line point should preferably all be in the same plane so that the rolling of the ship will not effectively displace the lubber line with reference to the card.

Direct reading of the compass is afforded through a heavy glass plate 8 mounted in an inclined upper face of the binnacle. This reading is facilitated by means of a lamp 9 situated within the binnacle and beneath the compass, the light from this lamp illuminating the whitened inner wall of the compass box and producing a bright background upon which the figures on the transparent card and the black point 7 stand out sharply defined. It is clear that anyone standing upon the hull of the vessel during surface cruising can read the compass in the ordinary manner.

In order that this same compass may be employed when the vessel is submerged, the optical system shown diagrammatically in Figure 1 is employed to project an image of the compass card to a point within the hull of the vessel. This system comprises a lamp 11 mounted above the compass in the upper part of the binnacle, and having a light source as small as practicable, a pair of condensing lenses 12 and 13 which gather the light rays from this source and pass them in substantial parallelism through an edge portion of the card, two erecting lenses 14 and 15, two projecting lenses 16 and 17, a mirror 19 or other suitable reflecting surface placed at an angle of 45 degrees to the axis of the system, and a ground glass 20 on which the image is finally focused. This image appears on the ground glass as shown in Fig. 4 with the sharp black point 7 uppermost and the scale directly readable. The scale is ordinarily printed on the upper face of the compass card for direct reading. The reverse image of this scale, as seen from beneath the card, is reversed by the system and appears on the ground glass in its normal position.

In accordance with well-known optical laws images of the card are formed at 26 and 20. As it is never possible to obtain a true point source of light, the beams at 25 and 18 are not lines as indicated but have an appreciable diameter dependent upon the size of the filament of lamp 11. By making this filament small and designing the system properly the diameter of the light beam at these points may be made very small, that is, only a fraction of an inch in diameter. Advantage is taken of this fact in the present invention, as will be explained later.

The lenses of this system are mounted within a lens tube 22 which extends from a point adjacent the compass, through the hull of the vessel, and to some observation point below. The binnacle is made watertight so that at the time of submergence no attention need be given to it. There is, however, the danger that the glass plate 8 may break due to the heavy pressure which it must withstand at times, and there is also the danger that the binnacle may spring a leak from other reasons or be dislodged by a shell. In such cases the danger arises of flooding the vessel through the lens tube 22. In order to avoid this possibility a gate valve 23 is placed in the tube and so positioned that it may be immediately closed should necessity arise. By placing this valve at the point 18 where the rays from the lamp 11 are brought together by means of projecting lenses 16 and 17, it is possible to employ a valve having a clear opening only one inch in diameter without in any way interfering with the light. A valve having so small an opening is quickly closed and when closed is more likely to be strong and leak-proof than a larger valve. The tube 22 may also be provided with a stuffing box 24 at a point where it passes through the hull of the vessel to prevent any leakage around it.

A sharp black point 7 projecting from the inner face of the compass box serving as a lubber line has been shown. During direct reading this black point stands out in clear relief against the white surface of the compass box. During indirect reading it is projected downwardly with the image of the card and appears upon ground glass 20. By placing the knife edge supports for the box, the card and the lubber line point 7 in one plane rolling of the ship does not effectively displace the point 7 relative to the card. This is important. The projecting system magnifies the image on the ground glass and hence a small actual throw of the point would appear of much greater magnitude on the glass.

By placing the compass without the hull of the vessel, and employing the system described above, it is possible practically to eliminate the disturbing magnetic influences of the vessel and to navigate by a single magnetic compass both while on the surface and while submerged.

The danger of flooding the vessel through the lens tube due to some leakage in the binnacle is entirely avoided by means of the gate valve, and by locating this valve at that part of the tube where the light rays converge it is possible to employ a valve having a very small opening, and hence one which can be more quickly operated and be less likely to leak when closed.

The idea of placing a valve of relatively small opening at a point in an optical system where the cross-sectional area of the converged light field is small is not necessarily limited to the present use but may be employed wherever it is necessary to close two sections of such a system from each other quickly and securely.

The optical system used has been shown more or less diagrammatically and no attempt has been made more than to illustrate in general lines the structure of any of the parts. It is clear that other specific means might be employed for attaining the same ends, and that the system may be used on surface ships as well as submarines.

I claim:

1. A compass system for ships, comprising the combination of a transparent-bottom compass box having whitened inner walls and an opaque lubber line extending inwardly therefrom, a transparent compass card bearing an opaque scale mounted within the compass box, illuminating means beneath the card illuminating the whitened inner walls of the compass box, thus forming a bright background upon which the compass scale can be easily and directly read from above, and means for projecting an image of the card and lubber line point upon a screen within the vessel.

2. An optical system, designed to project an image of an object situated without a submarine to a point within the submarine, comprising a tube, a series of lenses in said tube so arranged as to gather the light from the object and cause it to converge and then diverge, and means for closing the tube at a place where the cross section of the light field is relatively small.

3. An optical system, designed to project an image of a compass card situated without a submarine to a point within the submarine, comprising a tube, a series of lenses in said tube so arranged as to gather light passing through the card and cause it to converge to a field of relatively small cross section and then diverge, and a gate valve at the point of smallest cross section of the light field having an opening smaller in diameter than the tube and only slightly larger than the diameter of the converged light field.

In testimony whereof I affix my signature.

CHARLES H. BEDELL.